United States Patent
Gargiulo et al.

(10) Patent No.: US 9,095,912 B2
(45) Date of Patent: Aug. 4, 2015

(54) ADJUSTABLE DRILL GUIDE FOR WOODEN MODEL CARS

(71) Applicants: Joseph Louis Gargiulo, Trumbull, CT (US); John Robert Masotta, Newtown, CT (US)

(72) Inventors: Joseph Louis Gargiulo, Trumbull, CT (US); John Robert Masotta, Newtown, CT (US)

(73) Assignee: Joseph Louis Gargiulo, Trumbull, CT (US)

( * ) Notice: Subject to any disclaimer, the term of this patent is extended or adjusted under 35 U.S.C. 154(b) by 171 days.

(21) Appl. No.: 13/844,012

(22) Filed: Mar. 15, 2013

(65) Prior Publication Data

US 2014/0178141 A1    Jun. 26, 2014

Related U.S. Application Data

(60) Provisional application No. 61/740,313, filed on Dec. 20, 2012.

(51) Int. Cl.
B23B 47/28    (2006.01)

(52) U.S. Cl.
CPC ........... *B23B 47/287* (2013.01); *B23B 2247/04* (2013.01); *B23B 2260/004* (2013.01); *B23B 2260/124* (2013.01); *B23B 2260/136* (2013.01); *Y10T 408/563* (2015.01); *Y10T 408/5635* (2015.01)

(58) Field of Classification Search
CPC .. Y10T 408/567; B23B 47/28; B23B 47/287; B23B 47/288; B23B 49/00; B23B 49/02; B23B 2247/00; B23B 2247/12

USPC .... 408/72 B, 103, 108, 115 R, 115 B, 241 B, 408/97
See application file for complete search history.

(56) References Cited

U.S. PATENT DOCUMENTS

| | | | | |
|---|---|---|---|---|
| 1,128,970 | A | * | 2/1915 | Godefroy et al. ............... 408/97 |
| 2,033,072 | A | * | 3/1936 | Harp ................. 408/97 |
| 2,415,267 | A | * | 2/1947 | Vaughn .......................... 408/97 |
| 2,528,775 | A | * | 11/1950 | Ogden ............................ 33/644 |
| 2,619,730 | A | * | 12/1952 | Carter ............................. 33/666 |
| 2,641,147 | A | * | 6/1953 | Sulc ............................... 408/104 |
| 2,798,520 | A | * | 7/1957 | Maskulka et al. ......... 408/241 G |
| 4,137,003 | A | * | 1/1979 | Budoff .......................... 408/103 |
| 4,421,442 | A | * | 12/1983 | Lindblad .................. 408/115 R |
| 4,450,621 | A | * | 5/1984 | Bianchi ........................ 29/828 |
| 5,054,969 | A | * | 10/1991 | Gibson et al. ............. 408/115 R |
| 5,407,307 | A | * | 4/1995 | Park .......................... 408/115 R |
| 5,733,077 | A | † | 3/1998 | MacIntosh |
| 6,904,694 | B2 | † | 6/2005 | Launius |
| 7,210,880 | B2 | * | 5/2007 | Snider et al. ............. 408/115 R |

FOREIGN PATENT DOCUMENTS

GB                102557 A  * 12/1916

* cited by examiner
† cited by third party

*Primary Examiner* — Daniel Howell

(57) ABSTRACT

A tool drills holes into different sized wooden blocks so that the holes are precisely positioned while providing a means to position the tool to match an existing line or slot on the wooden block. The tool includes two identical pieces that, when assembled, adjusts to accommodate variable sized model car blocks, provides a view port to look through the tool for positioning, and contains perfectly aligned drill guide holes on either end and in the middle of the assembly to guide a drill bit that drills the required holes needed to accurately place axles and eyelets into the model car. The tool is adjustable to accommodate different sized blocks. The holes can be angled to create wheel camber when axles inserted.

19 Claims, 4 Drawing Sheets

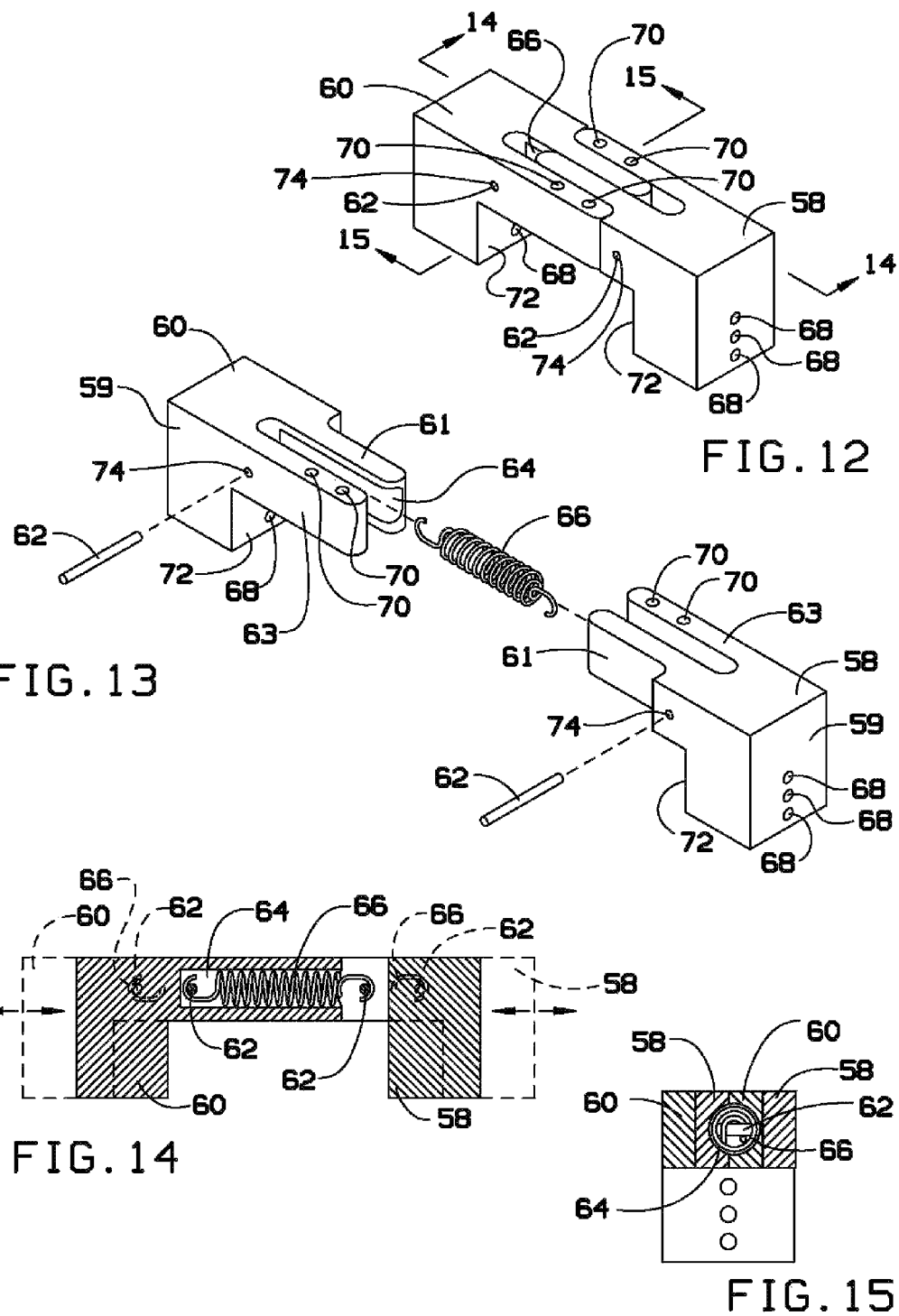

ADJUSTABLE DRILL GUIDE FOR WOODEN MODEL CARS

CROSS-REFERENCE TO RELATED APPLICATION

This application claims the benefit of priority of U.S. provisional application No. 61/740,313, filed Dec. 20, 2012, the contents of which are herein incorporated by reference.

BACKGROUND OF THE INVENTION

The present invention relates to drill guides and, more particularly, to an adjustable drill guide for wooden model cars.

Model car builders, such as pine wood derby or $CO_2$ powered car builders, often have to drill holes into different sized wooden blocks so that the holes are precisely positioned. For example, for wheel axles, drilled holes need to be precisely drilled on both sides of the wooden block. Typically, an existing line or slot is formed in the wooden block and the user needs to align the drilled holes therealong.

For $CO_2$ powered cars, a screw eye is typically attached to the underside of the wooden block near the front and rear axles of the car. These two screw eyes need to be aligned for the best movement of the car along a line threaded through the two screw eyes.

If these drilled holes are offset, it can affect the performance of the cars. Typically, these cars are raced and, therefore, precise drilling of axle holes and screw eye holes is important.

Conventional tools for making these holes are typically not adjustable, cannot be seen through, and some such tools only drill a single straight hole.

As can be seen, there is a need for a tool for drilling holes into different sized wooden blocks so that the holes are precisely positioned.

SUMMARY OF THE INVENTION

In one aspect of the present invention, a drill guide tool comprises a first jig fixture and a second jig fixture; a block portion of the first jig fixture and the second jig fixture; a plurality of side drill guide holes passing through the block portion and communicating with a clamping surface of the block portion; an arm portion extending from an upper portion of the block portion; and a view port formed when the first jig fixture and the second jig fixture are applied to an object to be drilled, the view port allowing to see the object clamped between the clamping surfaces of the first and second jig fixtures.

In another aspect of the present invention, a drill guide tool comprises a first jig fixture and a second jig fixture; a block portion of the first jig fixture and the second jig fixture; a plurality of side drill guide holes passing through the block portion and communicating with a clamping surface of the block portion; an arm portion extending from an upper portion of the block portion; a view port formed when the first jig fixture and the second jig fixture are applied to an object to be drilled, the view port allowing to see the object clamped between the clamping surfaces of the first and second jig fixtures; at least two center drill guide holes formed in the arm portion of the first and second jig fixtures; an adjustment slot formed in at least a portion of the arm portions of the first and second jig fixtures; and a mounting hole formed in the arm portions of the first and second jig fixtures, wherein a screw passes through the adjustment slot and into the mounting hole, wherein the distance between the clamping surfaces can be adjusted and fixed by tightening the screw.

In a further aspect of the present invention, a drill guide tool comprises a first jig fixture and a second jig fixture, wherein the first and second jig fixtures includes an inner arm and an outer arm, the inner arm of one of the first and second jig fixtures fitting in a slot formed between the inner arm and the outer arm of the other one of the first and second jig fixtures; a block portion of the first jig fixture and the second jig fixture; a plurality of side drill guide holes passing through the block portion and communicating with a clamping surface of the block portion; a view port formed when the first jig fixture and the second jig fixture are applied to an object to be drilled, the view port allowing to see the object clamped between the clamping surfaces of the first and second jig fixtures; a spring slot formed in facing surfaces of the inner arms of the first and second jig fixtures; a spring fitting in the spring slot and connected to the first and second jig fixtures at first and second ends of the spring and a spring pin passing through the first and second jig fixtures to attach the spring thereto.

These and other features, aspects and advantages of the present invention will become better understood with reference to the following drawings, description and claims.

BRIEF DESCRIPTION OF THE DRAWINGS

FIG. 12 is a perspective view of a spring-loaded drill guide tool according to another exemplary embodiment of the present invention;

FIG. 13 is an exploded perspective view of the spring-loaded drill guide tool of FIG. 12;

FIG. 14 is a cross-sectional view taken along line 14-14 of FIG. 12; and

FIG. 15 is a cross-sectional view taken along line 15-15 of FIG. 12.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a tool for drilling holes into different sized wooden blocks so that the holes are precisely positioned while providing a means to position the tool to match an existing line or slot on the wooden block. The tool includes two identical pieces that, when assembled, adjusts to accommodate variable sized model car blocks, provides a view port to look through the tool for positioning, and contains perfectly aligned drill guide holes on either end and in the middle of the assembly to guide a drill bit that drills the required holes needed to accurately place axles and eyelets into the model car. The tool is adjustable to accommodate different sized blocks. The holes can be angled to create wheel camber when axles inserted.

Figure 3:
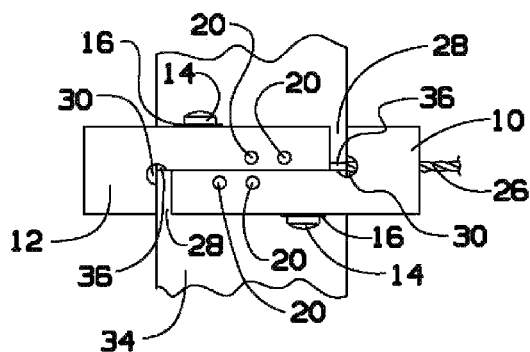
FIG. 3 is a top view of the drill guide tool of FIG. 1.
Figure 4:
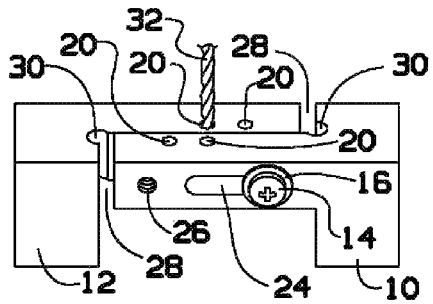
FIG. 4 is a perspective view of the drill guide tool of FIG. 1, illustrating the use of center drill guide holes in a narrow orientation.
Figure 5:
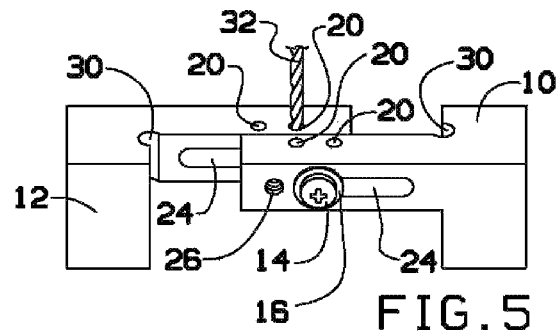
FIG. 5 is a perspective view of the drill guide tool of FIG. 1, illustrating the use of center drill guide holes in a wide orientation.
Figure 6:
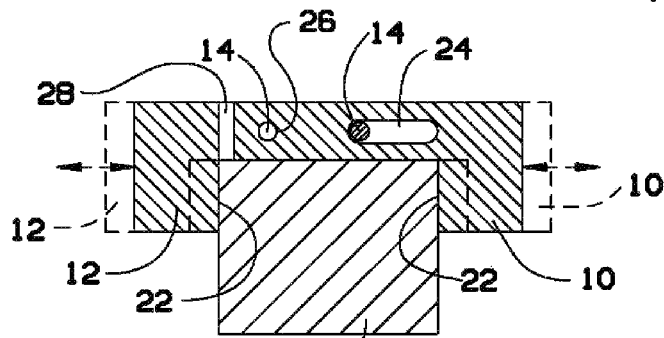
FIG. 6 is a cross-sectional view of the drill guide tool of FIG. 1, illustrating the adjustability of the jig fixture.
Figure 7:
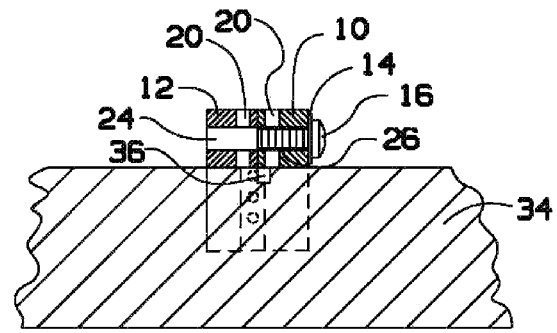
FIG. 7 is a cross-sectional view taken along line 7-7 of FIG. 1.
Figure 8:
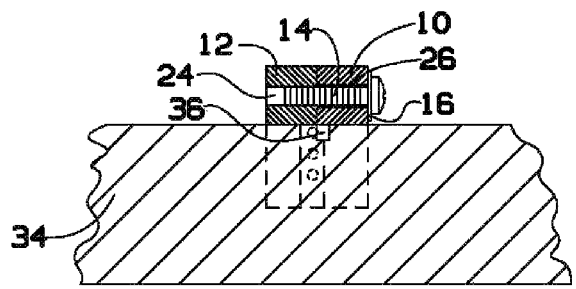
FIG. 8 is a cross-sectional view taken along line 8-8 of FIG. 1.
Figure 9:
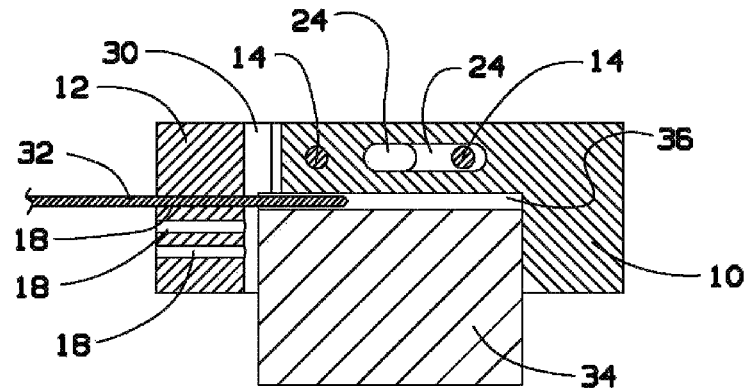
FIG. 9 is a cross-sectional view taken along line 9-9 of FIG. 1.

Referring to FIGS. 1 through 9, a drilling tool includes a first jig fixture 10 and a second jig fixture 12. The first and second jig fixtures 10, 12 are formed generally the same as each other and include a clamping surface 22 operable to be disposed against opposite sides of a wooden car block 34. The first and second jig fixtures 10, 12 can include a block portion 13, forming the clamping surface 22, and an arm portion extending from a portion of the block portion 13. Typically, the arm portion 11 extends from a top side of the block portion 13. The arm portion 11 can be about half the width of the block portion 13 so that when the two jigs 10, 12 are put together (as shown in FIG. 3 for example), there is formed a generally rectangular element.

Figure 1:
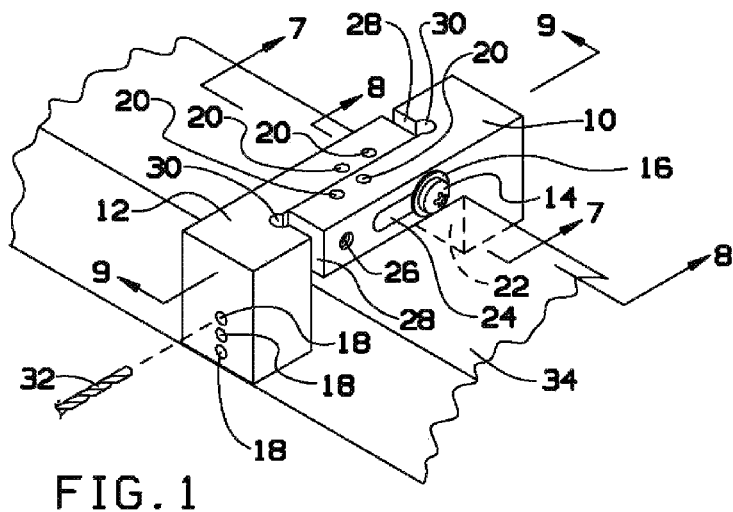
FIG. 1 is a perspective view of a drill guide tool, in use on a wooden block, according to an exemplary embodiment of the present invention.
Figure 2:
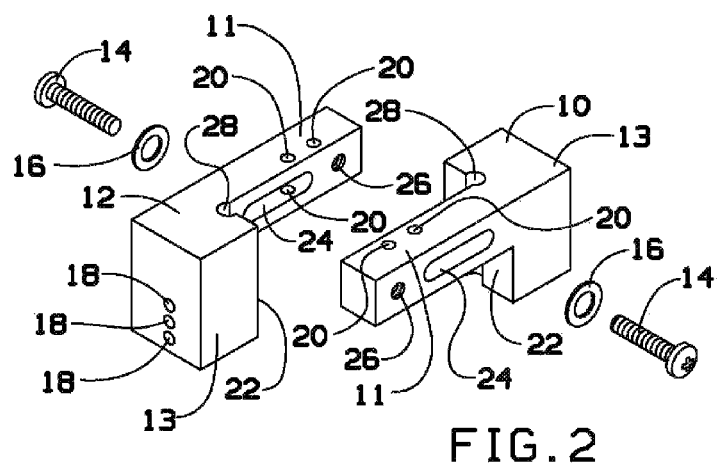
FIG. 2 is an exploded perspective view of the drill guide tool of FIG. 1, illustrated removed from the wooden block.

At least one side drill guide hole 18, often a plurality of side drill guide holes and typically three side drill guide holes 18, are formed through each of the first and second jig fixtures 10, 12 and communicate with the clamping surface 22. When placed on the wooden car block 34 (as shown in FIG. 1), a user can insert a drill bit 32 through a selected one of the side drill guide holes 18 to form a wheel axle hole in the wooden car block 34. In some embodiments, the side drill guide hole 18 can be angled to provide a wheel camber.

The first and second jig fixtures 10, 12 include mounting screws 14, with their associated washers 16, that fit through adjustment slots 24 in the first and second jig fixtures 10, 12 and threads into a mounting hole 26 in the first and second jig fixtures 10, 12. More specifically, one mounting screw 14 can fit through a first adjustment slot 24 in the first jig fixture 10 to thread into a second mounting hole 26 in the second jig fixture 12 and one mounting screw 14 can fit through a second adjustment slot 24 in the second jig fixture 12 to thread into a first mounting hole 26 in the first jig fixture 10. This design allows a distance between the clamping surfaces 22 of the first and second jig fixtures 10, 12 to be adjustable, allowing the tool of the present invention to be used for multiple sizes of wooden car blocks 34.

The first and second jig fixtures 10, 12 can include at least one and typically multiple center drill guide holes 20 formed therethrough. The center drill guide holes 20 can be used to place eyelets (not shown) on the bottom of the wooden car block 34. These eyelets can be used to guide the car along a line when the car is used, for example, in $CO_2$ powered car racing. In some embodiments, two center drill guide holes 20 are formed along the first and second jig fixture 10, 12 so that one of the center drill guide holes 20 on the first jig fixture 10 align with one of the center drill guide holes 20 on the second jig fixture 12 when the drill guide tool is placed on wooden car block 34. This allows the user to place eyelets at two or more positions, for example, along the bottom of the wooden car block 34 that are longitudinally aligned therealong.

One or more view ports 28 can be provided when the drill guide tool is placed on the wooden car block 34 as shown in FIG. 1. In some embodiments, the view ports 28 can be formed where the first and second fixture jigs 10, 12 do not meet, allowing a user to view the wooden car block 34. Often, the wooden car block 34 is marked, for example with a pre-cut slot 36, for placement of the wheel axle. With conventional drill guides, it can be difficult, if not impossible, to determine if the drilled axle hole will align with the mark on the wooden car block 34. With the drill guide tool of the present invention, a user can use the view ports 28 to easily and perfectly align the tool along the mark on the wooden car block 34.

The first and second fixture jigs 10, 12 can include chip clearance tunnels 30 to allow wood chips to escape when drilling axle holes in the wooden car block 34. The chip clearance tunnels 30 can be formed as hole drilled from where the arm portion 11 extends from the block portion 13 of the jig. This drilled hole can continue to the bottom of the block portion 13, passing along the side drill guide holes 18.

Figure 10:
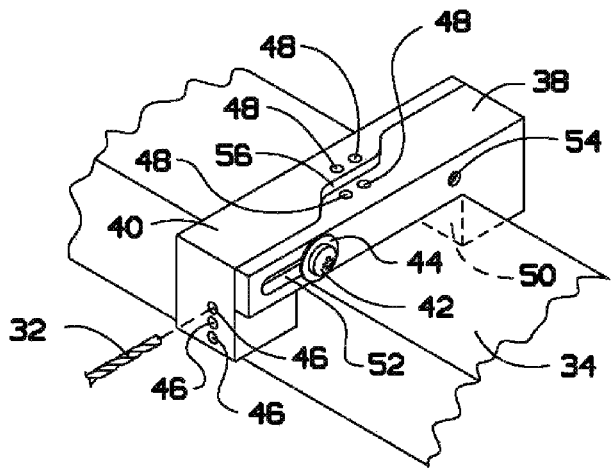
FIG. 10 is a perspective view of a drill guide tool, in use on a wooden block, according to another exemplary embodiment of the present invention.
Figure 11:
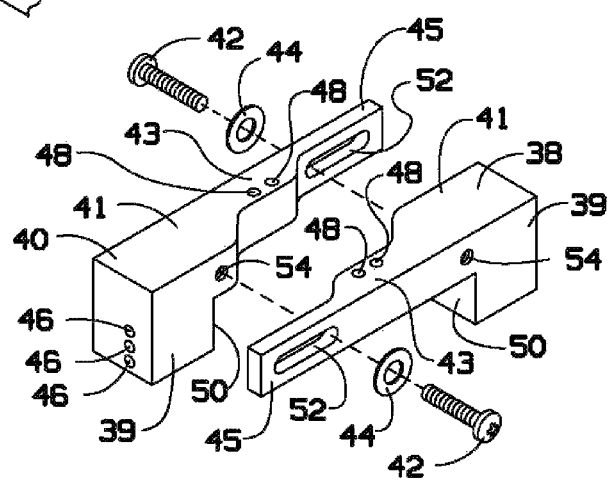
FIG. 11 is an exploded perspective view of the drill guide tool of FIG. 10, illustrated with the wooden block removed.

Referring now to FIGS. 10 and 11, in another exemplary embodiment of the present invention, a first jig fixture 38 and a second jig fixture 40 can be used similar to the first and second jig fixtures 10, 12 described above. In this embodiment, the arm portion can include a first width arm portion 41, a second width arm portion 43, and a third width arm portion 45, where the arm portions 41, 43 and 45 have successively reduced widths. A block portion 39 of the jig fixtures 38, 40 can include the clamping surface 50 for pressing on the side of a wooden car block, for example.

The first width arm portion 41 can have the same width as the block portion 39 and can include a mounting hole 54 formed as female threads therein. The third width arm portion 45 can have an adjustment slot 52 cut therein. Therefore, the third width arm portion 45 of the first jig fixture 38 can fit against the first with arm portion 41 and the block portion 39 of the second jig fixture 40 with a mounting screw 42 and washer 44 that passed through the adjustment slot 52 of one of the jig fixtures and into the mounting hole 54 of the other one of the jig fixtures.

When interconnected (as shown in FIG. 10), the second width arm portions 43 have a width to provide a view port 56 therebetween. The view port 56 allows the user to see where wheel axles would be positioned when drilled through one of the plurality of side drill guide holes 46.

Similar to that described above with respect to the jig fixtures 10, 12, the jig fixtures 38, 40 can include at least one and typically two or more center drill guide holes 48 formed through one or more of the arm portions 41, 43, 45 of each of the jig fixtures 38, 40. The center drill guide holes 48 can be used to drill holes for eyelet for $CO_2$ powered car racing design, for example.

While not shown in the Figures, the jig fixtures 38, 40 can include chip clearance tunnels to allow wood chips to escape while the wooden car block is being drilled. These chip clearance tunnels can be designed similar to those shown in the embodiment of the present invention described with respect to FIGS. 1 through 9.

Referring now to FIGS. 12 through 15, in another embodiment of the present invention, a first jig fixture 58 and a second jig fixture 60 can be held together with a spring 66 such that clamping surfaces 72 of the first and second jig fixtures 58, 60 can be resiliently pulled apart against the force of the spring 66.

Similar to the above jig fixtures 10, 12, 38, 40, the jig fixtures 58, 60 can include a block portion 59, having a clamping surface 72, an outer arm portion 63 and an inner arm portion 61. The inner and outer arm portions 61, 63 can be formed in the shape of two fingers running substantially parallel to each other so that the inner arm portion 61 of one of the jig fixtures 58, 60 can fit into a space between the inner arm portion 61 and the outer arm portion 63 of the other one of the jig fixtures 58, 60, as shown in FIG. 12.

A spring slot 64 can be cut on facing surfaces of the inner arm portions 61 of the jig fixtures 58, 60. A spring pin hole 74 can be disposed through the side of the block portion 59 to communicate with the spring slot 64. A spring pin 62 can be inserted into the spring pin hole 74 to retain an end of the spring 66. This can be performed for both of the jig fixtures 58, 60 so that the spring 66 holds them together. The spring 66 can be designed in various resiliencies to allow opening the jig fixtures 58, 60 to the desired width to fit onto the wooden car block.

The jig fixtures 58, 60, like those described above, can include a one or more side drill guide holes 68 and one or more center drill guide holes 70.

While not shown in the Figures, the jig fixtures 58, 60 can include chip clearance tunnels to allow wood chips to escape while the wooden car block is being drilled. These chip clearance tunnels can be designed similar to those shown in the embodiment of the present invention described with respect to FIGS. 1 through 9.

It should be understood, of course, that the foregoing relates to exemplary embodiments of the invention and that modifications may be made without departing from the spirit and scope of the invention as set forth in the following claims.

What is claimed is:

1. A drill guide tool comprising:
   a first jig fixture and a second jig fixture;
   a block portion of the first jig fixture and the second jig fixture;
   at least one side drill guide hole passing through the block portion and communicating with a clamping surface of the block portion, wherein the at least one drill guide hole comprises a diameter sized to snuggly receive a drill bit;
   an arm portion extending from an upper portion of the block portion, wherein the arm portion of the first jig fixture and the arm portion of the second jig fixture overlap; and
   a view port formed when the first jig fixture and the second jig fixture are applied to an object to be drilled, the view port allowing a user to see the object clamped between the clamping surfaces of the first and second jig fixtures.

2. The drill guide tool of claim 1, further comprising at least one center drill guide hole formed in the arm portion of the first and second jig fixtures.

3. The drill guide tool of claim 1, further comprising:
   an adjustment slot formed in at least a portion of the arm portions of the first and second jig fixtures; and
   a mounting hole formed in the arm portions of the first and second jig fixtures, wherein
   a screw passes through the adjustment slot and into the mounting hole, wherein the distance between the clamping surfaces can be adjusted and fixed by tightening the screw.

4. The drill guide tool of claim 1, further comprising chip clearance tunnels formed in the block portion of the first and second jig fixtures, the chip clearance tunnels forming a channel that communicates the at least one side drill guide hole on the clamping surfaces with an exterior of the first and second jig fixtures.

5. The drill guide tool of claim 3, wherein the arm portions are generally straight members.

6. The drill guide tool of claim 3, wherein the arm portions have a first arm portion, attached to the block portion, a second arm portion having a width less than the first arm portion, and a third arm portion having a width less than the second arm portion.

7. The drill guide tool of claim 6, wherein the third arm portion has the adjustment slot formed therein and the first arm portion has the mounting hole formed therein.

8. The drill guide tool of claim 6, wherein the view port is formed between the second arm portions of each of the first and second jig fixtures.

9. The drill guide tool of claim 1, wherein the first jig fixture is resiliently attached to the second jig fixture.

10. The drill guide tool of claim 9, wherein the first and second jig fixtures includes an inner arm and an outer arm extending from the block portion, the inner arm of one of the first and second jig fixtures fitting in a slot formed between the inner arm and the outer arm of the other one of the first and second jig fixtures.

11. The drill guide tool of claim 1, wherein the at least one side drill guide hole is angled to provide a wheel camber.

12. A drill guide tool comprising:
    a first jig fixture and a second jig fixture;
    a block portion of the first jig fixture and the second jig fixture;
    at least one side drill guide hole passing through the block portion and communicating with a clamping surface of the block portion;
    an arm portion extending from an upper portion of the block portion; and
    an adjustment slot formed in at least a portion of the arm portions of the first and second jig fixtures, wherein
    a screw passes through the adjustment slot wherein the distance between the clamping surfaces can be adjusted and fixed by tightening the screw.

13. A drill guide tool comprising:
    a first jig fixture and a second jig fixture, wherein the first and second jig fixtures includes an inner arm and an outer arm, the inner arm of one of the first and second jig fixtures fitting in a slot formed between the inner arm and the outer arm of the other one of the first and second jig fixtures;
    a block portion of the first jig fixture and the second jig fixture; and
    at least one side drill guide hole passing through the block portion and communicating with a clamping surface of the block portion, wherein the at least one drill guide hole comprises a diameter sized to snuggly receive a drill bit,
    wherein the first jig fixture is resiliently attached to the second jig fixture.

14. The drill guide tool of claim 13, further comprising at least one center drill guide holes formed in the arm portion of the first and second jig fixtures.

15. The drill guide tool of claim 13, further comprising a spring slot formed in facing surfaces of the inner arms of the first and second jig fixtures.

16. The drill guide tool of claim 15, further comprising a spring fitting in the spring slot and connected to the first and second jig fixtures at first and second ends of the spring.

17. The drill guide tool of claim 16, further comprising a spring pin passing through the first and second jig fixtures to attach the spring thereto.

18. The drill guide tool of claim 1, wherein the at least one side drill guide is a plurality of side drill guides vertically disposed along the block portion.

19. The drill guide tool of claim 1, wherein the view port is formed in between the arm portion of the first jig fixture and the block portion of the second jig fixture.

* * * * *